United States Patent
Rafiei et al.

(10) Patent No.: US 12,412,295 B2
(45) Date of Patent: Sep. 9, 2025

(54) METHODS AND SYSTEMS FOR ESTIMATING HITCH ARTICULATION ANGLE

(71) Applicant: GM GLOBAL TECHNOLOGY OPERATIONS LLC, Detroit, MI (US)

(72) Inventors: Ali Rafiei, Newmarket (CA); Yun Qian Miao, Waterloo (CA); Alaa Khamis, Courtice (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 392 days.

(21) Appl. No.: 18/172,789

(22) Filed: Feb. 22, 2023

(65) Prior Publication Data
US 2024/0281993 A1    Aug. 22, 2024

(51) Int. Cl.
G06T 7/70 (2017.01)
G06T 7/80 (2017.01)
H04N 7/18 (2006.01)

(52) U.S. Cl.
CPC ............. G06T 7/70 (2017.01); G06T 7/80 (2017.01); H04N 7/183 (2013.01); *G06T 2207/30244* (2013.01); *G06T 2207/30252* (2013.01)

(58) Field of Classification Search
CPC ... G06T 7/80; G06T 2207/30252; G06T 7/73; B60R 1/22
See application file for complete search history.

(56) References Cited

U.S. PATENT DOCUMENTS

| | | | | |
|---|---|---|---|---|
| 9,437,055 B2* | 9/2016 | Kuehnle | ............... | G07C 5/0816 |
| 9,610,975 B1* | 4/2017 | Hu | ............ | B60D 1/06 |
| 11,443,413 B2* | 9/2022 | Nakagawa | ................ | B60R 1/27 |
| 2018/0350108 A1* | 12/2018 | Wang | ....................... | G06T 7/254 |
| 2020/0086702 A1* | 3/2020 | Ling | ....................... | B62D 1/00 |
| 2020/0164803 A1* | 5/2020 | Jales Costa | ......... | B62D 15/0285 |
| 2022/0227418 A1* | 7/2022 | Vilca | ....................... | G06N 20/00 |
| 2022/0291377 A1* | 9/2022 | Medinei | .................. | G01S 15/42 |
| 2023/0290001 A1* | 9/2023 | Ramirez Llanos | ....... | G06T 7/55 |

* cited by examiner

*Primary Examiner* — Chan S Park
*Assistant Examiner* — Chandhana Pedapati
(74) *Attorney, Agent, or Firm* — Ingrassia Fisher & Lorenz LLP (57) ABSTRACT

Methods and systems are provided for a vehicle. In one embodiment, a method includes: storing, in a datastore device, intrinsic and extrinsic parameter data associated with an image sensor coupled to a trailer and configured to capture an image that includes at least a portion of the vehicle; receiving, by a processor, image data from the image sensor of the trailer; determining, by the processor, a region of interest within the image data based on a feature of the vehicle; computing, by the processor, a hitch articulation angle from the region of interest and the parameter data; and generating, by the processor, hitch articulation angle data for use in controlling at least one of the vehicle and the trailer.

20 Claims, 4 Drawing Sheets

METHODS AND SYSTEMS FOR ESTIMATING HITCH ARTICULATION ANGLE

INTRODUCTION

The technical field generally relates to vehicles and, more specifically, to methods and systems for determining an articulation angle of a hitch of a vehicle when the vehicle is towing a trailer and controlling the vehicle based thereon.

Towing a trailer with a vehicle can be difficult for many drivers. A ball hitch or other hitch systems are typically employed as a connection means and provides a joint between the vehicle and the trailer. When reversing, aiming the trailer involves turning the rear of the vehicle in the opposite direction of the desired direction of the trailer. For automated and advanced driver assistance systems (ADAS) equipped vehicles, a hitch articulation angle (HAA) is used for performing ADAS maneuvers such automated reversal of the trailer for parking, boat launch, etc. as well as for other features such jack knife detection.

In some instances, the hitch articulation angle can be estimated from image data received from a camera of the vehicle that captures images of the trailer. Errors may occur in the estimation when identification of the trailer in the image data is mistaken with elements of the environment in case of a fifth-wheel trailer without any distinguishable texture or in case of a gooseneck trailer with visible structure being covered in a single-shade paint.

Accordingly, it is desirable to provide methods and systems for determining the articulation angle of a hitch of a vehicle. Furthermore, other desirable features and characteristics of the present invention will become apparent from the subsequent detailed description of the invention and the appended claims, taken in conjunction with the accompanying drawings and this background of the invention.

SUMMARY

Methods and systems are provided for a vehicle. In one embodiment, a method includes: storing, in a datastore device, intrinsic and extrinsic parameter data associated with an image sensor coupled to a trailer and configured to capture an image that includes at least a portion of the vehicle; receiving, by a processor, image data from the image sensor of the trailer; determining, by the processor, a region of interest within the image data based on a feature of the vehicle; computing, by the processor, a hitch articulation angle from the region of interest and the parameter data; and generating, by the processor, hitch articulation angle data for use in controlling at least one of the vehicle and the trailer.

In various embodiments, the feature of the vehicle includes a static feature of an exterior of the vehicle.

In various embodiments, the feature of the vehicle includes a center high mount stop light (CHMSL) feature.

In various embodiments, the extrinsic parameters include a position of the image sensor relative to a vehicle.

In various embodiments, the computing the hitch articulation angle is based on:

$$\theta = \arcsin\left(\frac{bP_x f_c + \sqrt{a^2 P_x^2 f_c^2 + b^2 P_x^4 - a^2 P_x^4}}{a(f_c^2 - P_x^2)}\right),$$

where a and b represent the image sensor placement relative to a vehicle cabin, and $P_x$ and $f_c$ are the intrinsic parameters of the image sensor.

In various embodiments, the storing is based on user input received from a user of the vehicle.

In various embodiments, the storing is based on at least one of intrinsic and extrinsic parameters determined from a regression model.

In various embodiments, the method includes processing, by the processor, region of interest data with the regression model and a kinematic model of the vehicle and the trailer to determine the at least one of intrinsic and extrinsic parameters.

In another embodiment, a system includes: a non-transitory computer readable medium configured to stored intrinsic and extrinsic parameter data associated with an image sensor coupled to a trailer and configured to capture an image that includes at least a portion of the vehicle; and a computer system onboard the vehicle. The computer system is configured to, by a processor; receive image data from the image sensor of the trailer; determine a region of interest within the image data based on a feature of the vehicle; compute a hitch articulation angle from the region of interest and the parameter data; and generate hitch articulation angle data for use in controlling at least one of the vehicle and the trailer.

In various embodiments, the feature of the vehicle includes a static feature of an exterior of the vehicle.

In various embodiments, the feature of the vehicle includes a center high mount stop light (CHMSL) feature.

In various embodiments, the extrinsic parameters include a position of the image sensor relative to a vehicle cabin.

In various embodiments, the computer system is configured to compute the hitch articulation angle based on:

$$\theta = \arcsin\left(\frac{bP_x f_c + \sqrt{a^2 P_x^2 f_c^2 + b^2 P_x^4 - a^2 P_x^4}}{a(f_c^2 - P_x^2)}\right),$$

where a and b represent the image sensor placement relative to a vehicle cabin, and $P_x$ and $f_c$ are the intrinsic parameters of the image sensor.

In various embodiments, the computer system is configured to store based on user input received from a user of the vehicle.

In various embodiments, the computer system is configured to store based on at least one of intrinsic and extrinsic parameters determined from a regression model.

In various embodiments, the computer system is further configured to, by the processor, process the region of interest data with the regression model and a kinematic model of the vehicle and the trailer to determine the at least one of intrinsic and extrinsic parameters.

In another embodiment, a vehicle includes: a hitch configured to tow a trailer including an image sensor configured to capture at least a portion of the vehicle; and a computer system configured to, by a processor; receive image data from the image sensor of the trailer; determine a region of interest within the image data based on a feature of the vehicle; compute a hitch articulation angle from the region of interest and the parameter data; and generate hitch articulation angle data for use in controlling at least one of the vehicle and the trailer.

In various embodiments, the vehicle includes a center high mount stop light (CHMSL) feature, and wherein the region of interest is determined based on the CHMSL feature.

In various embodiments, the computer system is configured to compute the hitch articulation angle based on:

$$\theta = \arcsin\left(\frac{bP_x f_c + \sqrt{a^2 P_x^2 f_c^2 + b^2 P_x^4 - a^2 P_x^4}}{a(f_c^2 - P_x^2)}\right),$$

where a and b represent an image sensor placement relative to a vehicle cabin, and $P_x$ and $f_c$ are the intrinsic parameters of the image sensor.

In various embodiments, the computer system is further configured to, by the processor, process the region of interest data with the regression model and a kinematic model of the vehicle and the trailer to determine the at least one of intrinsic and extrinsic parameters.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
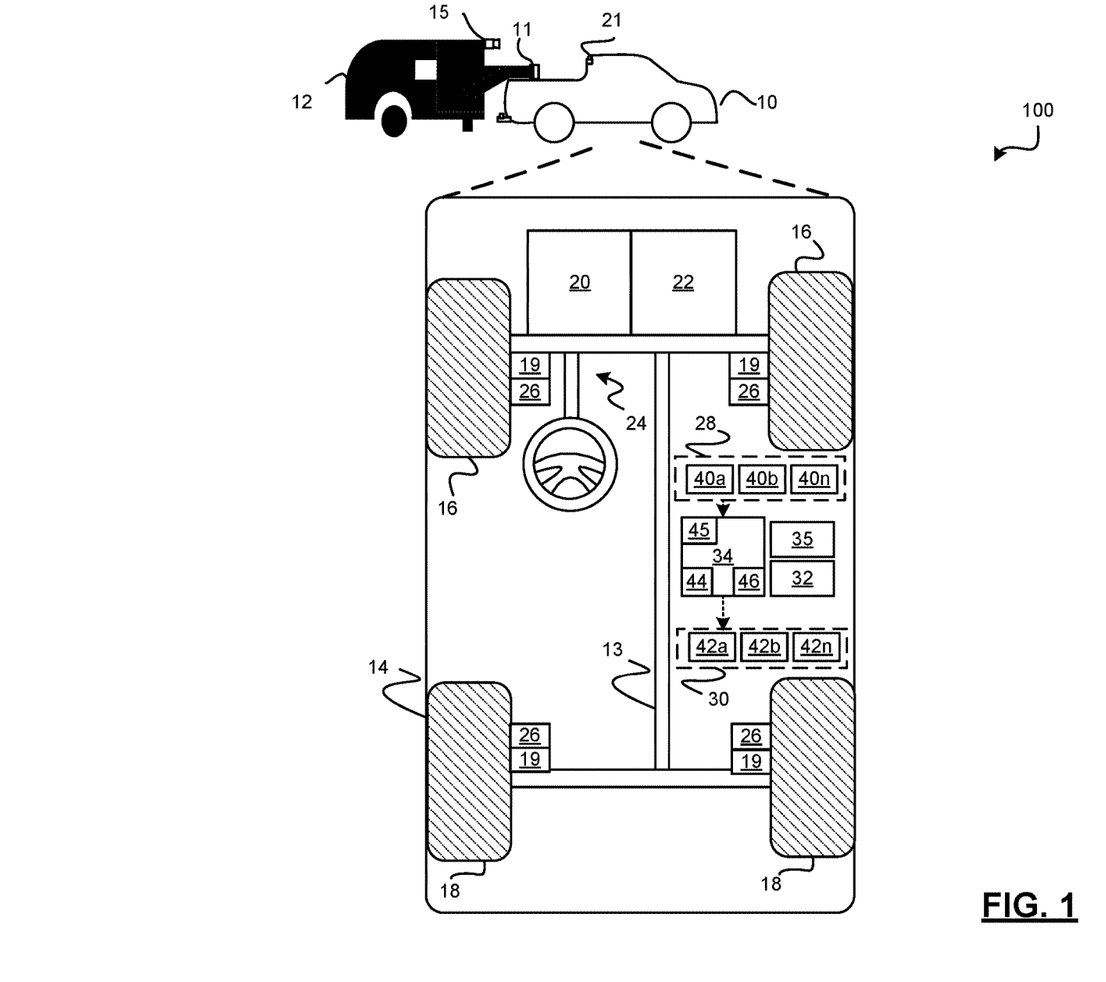
FIG. 1 is a functional block diagram of a vehicle that includes a hitch system, in accordance with various embodiments.

With reference to FIG. 1, a hitch system shown generally at 100 is associated with a vehicle 10 in accordance with various embodiments. Generally, the hitch system 100 estimates a hitch articulation angle based on images of the vehicle 10 to reduce error that may occur in the estimation due to mistaken identification of elements in the image. The hitch articulation angle is then used in viewing/display, perception, and other areas of control of the vehicle 10.

In various embodiments, the vehicle 10 comprises an automobile configured to tow a trailer 12. The vehicle 10 may be any one of a number of different types of automobiles, such as, for example, a sedan, a wagon, a truck (as shown), or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In various embodiments, the vehicle 10 may also comprise other types of mobile platforms and is not limited to an automobile. In various embodiments, the trailer 12 may be any type of towable application having one or more wheels and is not limited to any one embodiment.

The vehicle 10 is configured to couple to and connect to the trailer 12 via a connection apparatus 11 and is configured to tow the trailer 12. In various embodiments, the connection apparatus 11 comprises a hitch mechanism for bed hitch trailers such as, but not limited to, a gooseneck or a fifth wheel trailer, and so on. In various embodiments, the connection apparatus 11 further comprises a wiring harness configured to communicate power and/or communication signals to and from components of the trailer 12. In various embodiments, the trailer 12 includes a sensor system 15, such as an image sensor including a connected camera, configured to sense an environment of the trailer 12 and at least a portion of the vehicle 10. As can be appreciated, the sensor system 15 may be disposed at any location of the trailer 12 so long as a portion of the vehicle 10 is viewable. In various embodiments, the sensor system 15 is configured in a position such that a center high mount stop light (CHMSL) area 21, or other static and identifiable area of the vehicle 10 is viewable.

As depicted in FIG. 1, the exemplary vehicle 10 generally includes a chassis 13, a body 14, front wheels 16, rear wheels 18, and a suspension system 19. The body 14 is arranged on the chassis 13 and substantially encloses components of the vehicle 10. The body 14 and the chassis 13 may jointly form a frame. The wheels 16-18 are each rotationally coupled to the chassis 13 through the suspension system 19 near a respective corner of the body 14.

The vehicle 10 further includes a propulsion system 20, a transmission system 22, a steering system 24, a brake system 26, a sensor system 28, an actuator system 30, at least one data storage device 32, at least one controller 34, and a display system 35. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior and/or interior environment of the vehicle and/or of the vehicle itself. The sensing devices 40a-40n can include, but are not limited to, radars, lidars, global positioning systems, optical cameras, thermal cameras, ultrasonic sensors, inertial measurement units, pressure sensors, position sensors, displacement sensors, speed sensors, and/or other sensors.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in controlling the vehicle 10. In various embodiments, the data storage device 32 stores defined values for controlling the vehicle. As can be appreciated, the data storage device 32 may be part of the controller 34, separate from the controller 34, or part of the controller 34 and part of a separate system.

The controller 34 includes at least one processor 44, a communication bus 45, a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle and/or trailer. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the hitch system 100 and, when executed by the processor 44, receive data from the sensor system 15 and process the received data in order to determine an articulation angle of the hitch 11 and to control the vehicle 10 based thereon. For example, the instructions process data from image sensor to identify a region of interest that includes the CHMSL area 21 or some other static, identifiable area within the image and to use the identified region of interest to estimate a hitch articulation angle and confidence score. The instructions may further control operation of the vehicle 10 and/or trailer 12 based on the estimated hitch articulation angle and/or confidence score.

As can be appreciated, the controller 34 may otherwise differ from the embodiment depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to conduct the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

Figure 2:
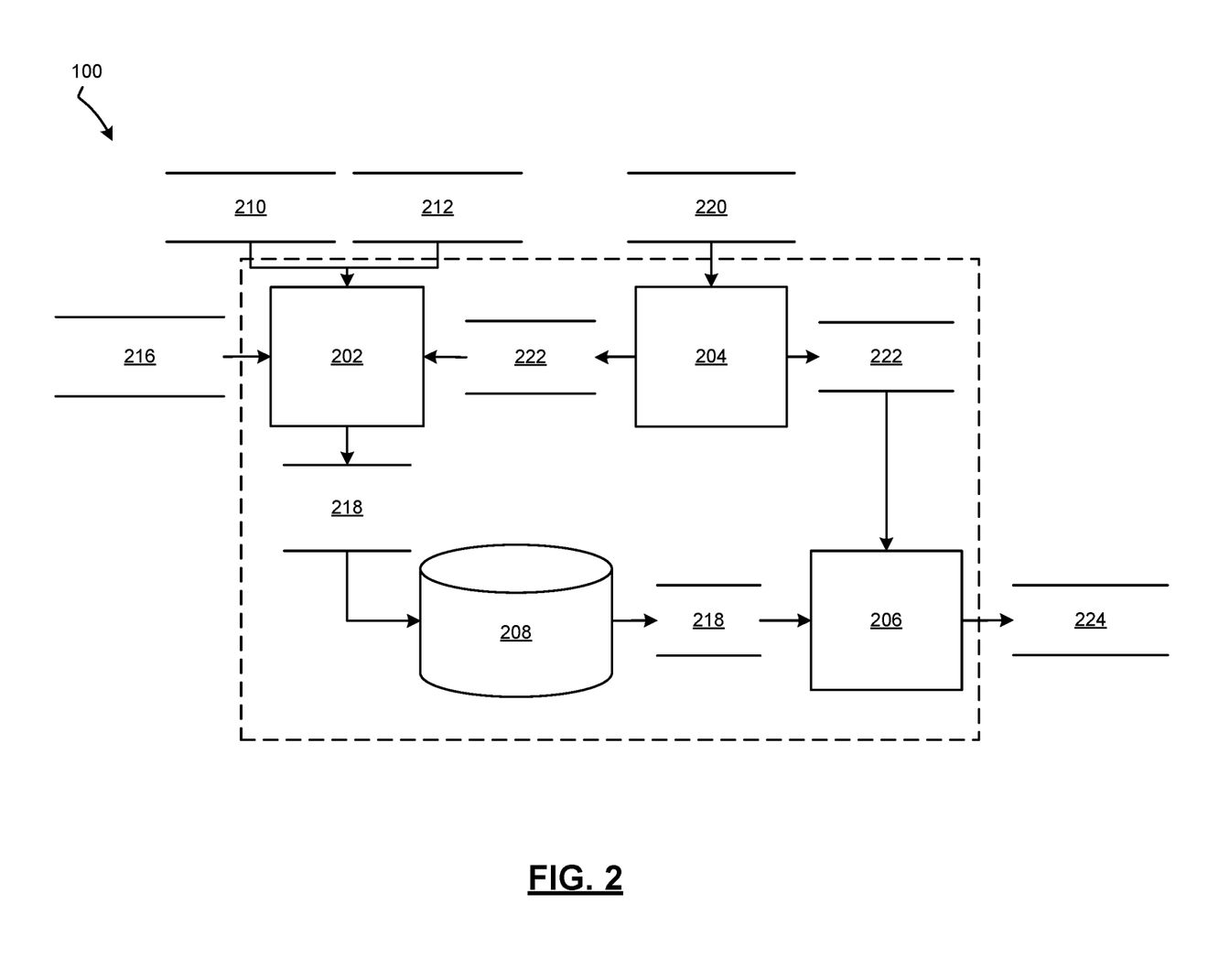
FIG. 2 is a dataflow diagram illustrating elements of the hitch system of the vehicle of FIG. 1, in accordance with various embodiments.

With reference to FIG. 2 and with continued reference to FIG. 1, a dataflow diagram illustrates elements of the hitch system 100 of FIG. 1 in accordance with various embodiments. As can be appreciated, various embodiments of the hitch system 100 according to the present disclosure may include any number of modules embedded within the controller 34 which may be combined and/or further partitioned to similarly implement systems and methods described herein. Furthermore, inputs to the hitch system 100 may be received from the sensor system 15 and/or the sensor system 28, received from other control modules (not shown) associated with the vehicle 10 and/or the trailer 12, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like. In various embodiments, the hitch system 100 includes an initialization module 202, a region of interest determination module 204, a hitch articulation determination module 206, and a parameter datastore 208.

In various embodiments, the initialization module 202 receives as input vehicle data 210, user input data 212, and/or image data 216. Based on the inputs, the initialization module 202 initializes intrinsic and extrinsic parameters of the sensor system 15 that are used in determining the hitch articulation angle. For example, the initialization module 202 initializes the parameters based on the user input data 212 that is entered by a user, for example, when connecting the sensor system 15 to the trailer 12 and stores the parameter data 218 in the parameter datastore 208.

In another example, the initialization module 202 initializes the parameters based on a regression model, and region of interest data 222 that is determined from images of the vehicle 10. For example, the initialization module 202 evaluates the vehicle data 210 to confirm that a maneuver is being performed. When, for example, a short straight or turning maneuver of known value is being performed, the initialization module 202 estimates the intrinsic and extrinsic parameters of the sensor system 15 and stores the parameter data 218 in the parameter datastore 208.

In various embodiments, the initialization module 202 estimates the parameters from coefficients used in a regression model for estimating the hitch articulation angle. The regression model may be a polynomial-based or machine-learning based regression model. In such embodiments, a kinematic model of the vehicle 10 and the trailer 12 is used to determine a hitch articulation angle reference point on the vehicle 10.

In various embodiments, the region of interest determination module 204 receives as input image data 220 from, for example, the sensor system 15. The region of interest determination module 204 processes the image data 220 to identify a region of interest including, for example, the CHMSL region or some other static region on the vehicle 10. The region of interest determination module 204 identifies the static region of the vehicle 10 in the image data 220 with a bounding box and a center point and generates the region of interest data 222 based thereon.

Figure 3:
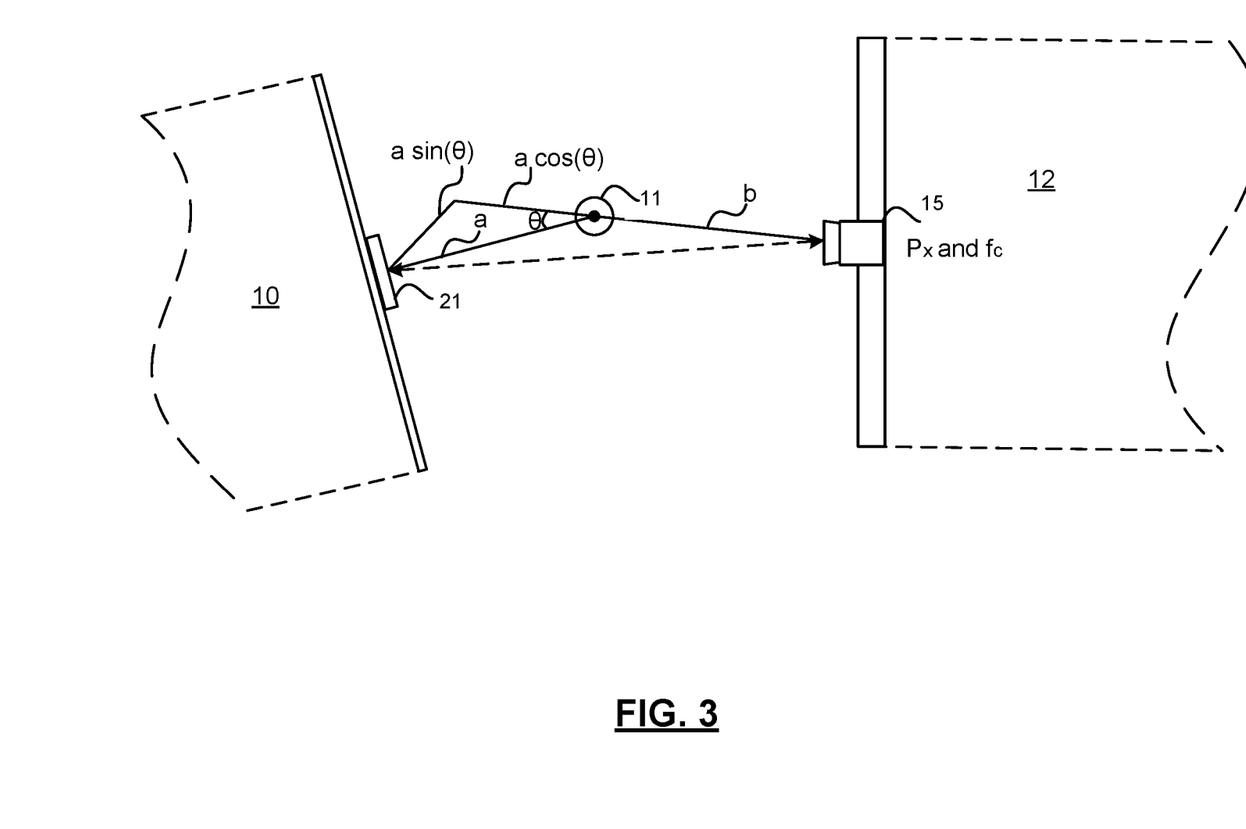
FIG. 3 is an illustration of parameters relative to the vehicle and the image sensor, in accordance with various embodiments.

In various embodiments, the hitch articulation determination module 206 receives as input the region of interest data 222. The hitch articulation determination module 206 obtains the parameters data 218 from the parameter datastore 208. The hitch articulation determination module 206 computes the real-time hitch articulation angle as the vehicle 10 is operating based on the region of interest data 222 and the parameters data 218 from the parameters datastore 208. For example, the hitch articulation determination module 206 computes the hitch articulation angle based on the following trigonometric relationship:

$$\frac{P_x}{f_c} = \frac{a*\sin\theta}{a*\cos\theta + b}, \quad (1)$$

and $$\theta = \arcsin\left(\frac{bP_x f_c + \sqrt{a^2 P_x^2 f_c^2 + b^2 P_x^4 - a^2 P_x^4}}{a(f_c^2 - P_x^2)}\right), \quad (2)$$

where, as shown in FIG. 3, a and b represent the sensor system placement relative to a cabin of the vehicle 10, and $P_x$ and $f_c$ are intrinsic parameters of the sensor system 15. The hitch articulation determination module 206 generates the hitch articulation angle data 224 based on the computed value. The hitch articulation angle data 224 is used to control various aspects of the vehicle 10 and/or the trailer 12 including but not limited to viewing/display, perception, and other controlled features.

Figure 4:
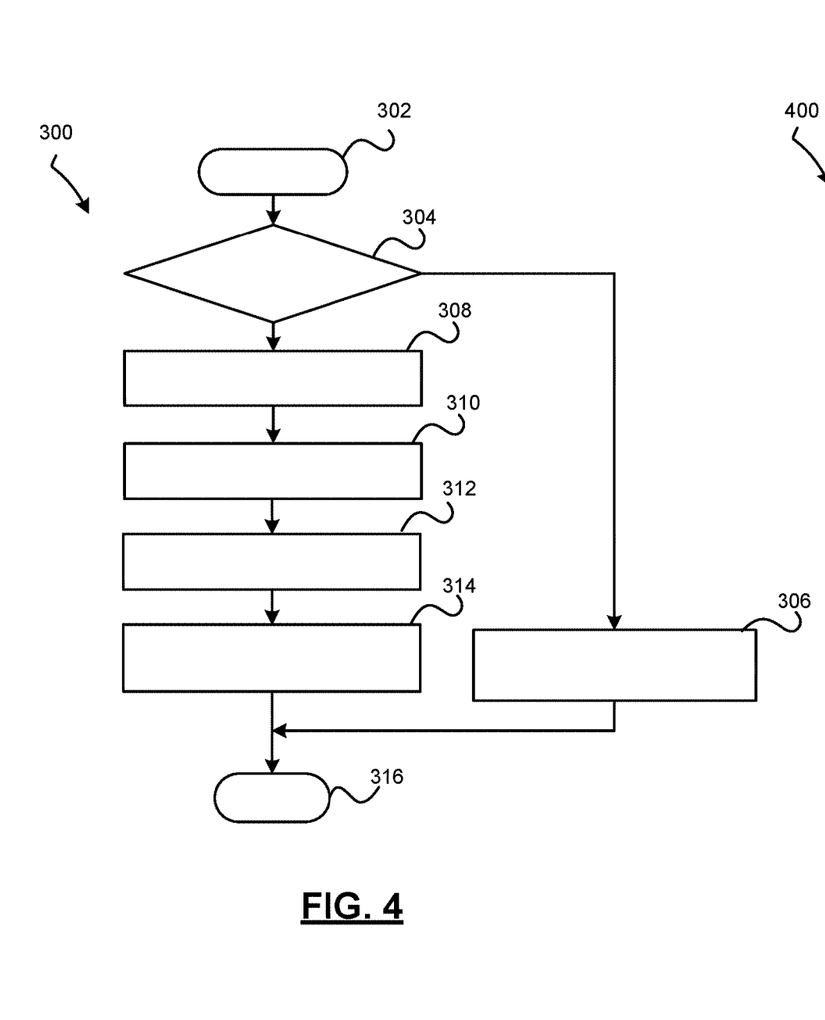
FIGS. 4 and 5 are flowcharts illustrating processes for determining a hitch articulation angle as performed by the hitch system of the vehicle of FIGS. 1 and 2, in accordance with exemplary embodiments.
Figure 5:
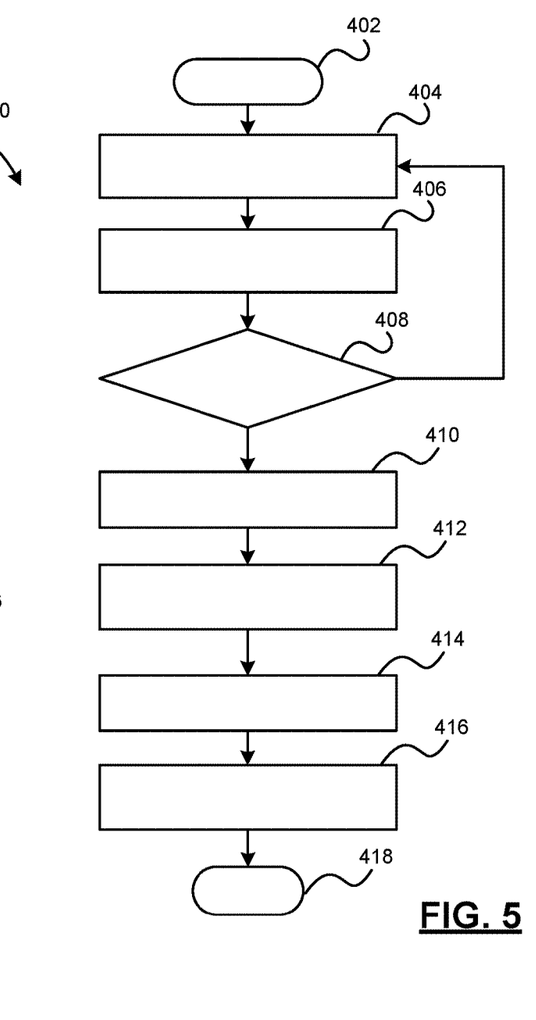

With reference now to FIGS. 4 and 5 and with continued reference to FIGS. 1-3 flowcharts are provided of methods 300, 400 for determining hitch information and controlling a vehicle 10 based thereon, in accordance with exemplary embodiments. As can be appreciated in light of the disclosure, the order of operation within the methods 300, 400 is not limited to the sequential execution as illustrated in FIGS. 4 and 5, but may be performed in one or more varying orders as applicable and in accordance with the present disclosure. In various embodiments, the methods 300, 400 can be scheduled to run based on one or more predetermined events, and/or can run continuously during operation of the vehicle 10.

In one example, the method 300 may begin at 302. It is determined whether initialization has been performed at 304. When initialization has not been performed at 304, notification data indicating initialization is needed is generated at 306. Thereafter, the method 300 may end at 316. In various embodiments, initialization may be performed as shown in FIG. 5.

Once initialization has been performed, for example, by way of user input and/or estimation during a maneuver, the image data 220 is received at 308 and processed to identify the region of interest information at 310. The region of interest information and the stored parameters are used to compute the hitch articulation angle at 312. Thereafter, hitch articulation angle data is generated to control features of the vehicle 10 such as, but not limited to, viewing/display, perception, and other control features of the vehicle 10 at 314. Thereafter, the method 300 may end at 316.

In one example, the method 400 may begin at 402. Notification data is generated to instruct the driver to perform a maneuver at 404. Thereafter, vehicle data 210 is received at 406. The vehicle data 210 is evaluated to determine whether the maneuver is being performed at 408. Once it is determined that the maneuver is being performed at 408, image data 220 is received at 410 and processed at 412 to determine the region of interest information including the bounding box and center point. The region of interest information is used with a regression model to determine the intrinsic and extrinsic parameters of the camera at 414. The parameters are stored in the parameters datastore 208 at 416. Thereafter, the method 400 may end at 418.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of a vehicle, comprising:
    providing the vehicle including:
        a hitch configured to tow a trailer including an image sensor configured to capture at least a portion of the vehicle;
        a propulsion system;
        a transmission system;
        a steering system;
        a braking system;
        an actuator system coupled to the propulsion system, the transmission system, the steering system, and the braking system; and
        a processor communicatively coupled to the image sensor and the actuator system;
    receiving, by the processor, vehicle data, user input data, and image data from the image sensor;
    initializing, by the processor, intrinsic and extrinsic parameters associated with the image sensor including a connected camera based on the vehicle data, the user input data, and the image data, wherein the intrinsic parameters comprise a focal length ($f_c$) and a principal point ($P_x$) of the connected camera and the extrinsic parameter comprises a placement of the image sensor relative to a vehicle cabin of the vehicle;
    storing, by the processor, in a datastore device, the intrinsic and extrinsic parameters associated with the image sensor, wherein the image sensor is coupled to the trailer and configured to capture the image data that includes at least the portion of the vehicle;
    receiving, by the processor, the image data from the image sensor of the trailer;
    identifying, by the processor, a center high mount stop light (CHMSL) region of the vehicle in the image data with a bounding box and a center point;
    determining, by the processor, a region of interest within the image data based on the CHMSL region of the vehicle in the image data with the bounding box and the center point;
    computing, by the processor, a real-time hitch articulation angle from the region of interest and the intrinsic and extrinsic parameters while the vehicle is operating, wherein the computing the real-time hitch articulation angle is based on:

$$\theta = \arcsin\left(\frac{bP_x f_c + \sqrt{a^2 P_x^2 f_c^2 + b^2 P_x^4 - a^2 P_x^4}}{a(f_c^2 - P_x^2)}\right),$$

where a and b represent the placement of the image sensor relative to the vehicle cabin, $P_x$ is the principal point of the connected camera, and $f_c$ is the focal length of the connected camera; and
    generating control signals to the actuator system to automatically control the features of the vehicle and the trailer based on the hitch articulation angle, wherein the features of the vehicle comprise the propulsion system, the transmission system, the steering system, and the braking system of the vehicle.

2. The method of claim 1, wherein the CHMSL is a static feature of an exterior of the vehicle.

3. The method of claim 1, wherein the storing is based on the user input received from a user of the vehicle.

4. The method of claim 1, wherein the storing is based on the intrinsic and extrinsic parameters determined from a regression model.

5. The method of claim 4, further comprising processing, by the processor, the region of interest with the regression model and a kinematic model of the vehicle and the trailer to determine the intrinsic and extrinsic parameters.

6. The method of claim 1, wherein the features of the vehicle further comprise doors of the vehicle and a trunk of the vehicle.

7. The method of claim 1, wherein the features of the vehicle further comprise cabin features of the vehicle.

8. A system of a vehicle, comprising:
    a hitch configured to tow a trailer including an image sensor configured to capture at least a portion of the vehicle;
    a propulsion system;
    a transmission system;
    a steering system;
    a braking system;
    an actuator system coupled to the propulsion system, the transmission system, the steering system, and the braking system; and
    a computer system onboard the vehicle, communicatively coupled to the image sensor and the actuator system, and configured to, by a processor:
        receive vehicle data, user input data, and image data from the image sensor;
        initialize intrinsic and extrinsic parameters associated with the image sensor including a connected camera based on the vehicle data, the user input data, and the image data, wherein the intrinsic parameters comprise a focal length ($f_c$) and a principal point ($P_x$) of the connected camera and the extrinsic parameter comprises a placement of the image sensor relative to a vehicle cabin of the vehicle;
        store in a datastore device, the intrinsic and extrinsic parameters associated with the image sensor, wherein the image sensor is coupled to the trailer and configured to capture the image data that includes at least the portion of the vehicle;
        receive the image data from the image sensor of the trailer;
        identify a center high mount stop light (CHMSL) region of the vehicle in the image data with a bounding box and a center point;
        determine a region of interest within the image data based on the CHMSL region of the vehicle in the image data with the bounding box and the center point;
        compute a hitch articulation angle from the region of interest and the intrinsic and extrinsic parameters while the vehicle is operating, wherein the computing the real-time hitch articulation angle is based on:

$$\theta = \arcsin\left(\frac{bP_x f_c + \sqrt{a^2 P_x^2 f_c^2 + b^2 P_x^4 - a^2 P_x^4}}{a(f_c^2 - P_x^2)}\right),$$

where a and b represent the placement of the image sensor relative to the vehicle cabin, $P_x$ is the principal point of the connected camera, and $f_c$ is the focal length of the connected camera; and generating control signals to the actuator system to automatically control the features of the vehicle and the trailer based on the hitch articulation angle, wherein the features of the vehicle comprise the propulsion system, the transmission system, the steering system, and the braking system of the vehicle.

9. The system of claim 8, wherein the features of the vehicle includes a static feature of an exterior of the vehicle.

10. The system of claim 8, wherein the computer system is configured to, by the processor, store based on the user input received from a user of the vehicle.

11. The system of claim 8, wherein the computer system is configured to, by the processor, store based on the intrinsic and extrinsic parameters determined from a regression model.

12. The system of claim 11, wherein the computer system is further configured to, by the processor, process the region of interest with the regression model and a kinematic model of the vehicle and the trailer to determine the intrinsic and extrinsic parameters.

13. The system of claim 8, wherein the features of the vehicle further comprise doors of the vehicle, a trunk of the vehicle, and cabin features of the vehicle.

14. A vehicle, comprising:
a hitch configured to tow a trailer including an image sensor configured to capture at least a portion of the vehicle;
a propulsion system;
a transmission system;
a steering system;
a braking system;
an actuator system coupled to the propulsion system, the transmission system, the steering system, and the braking system; and
a computer system communicatively coupled to the image sensor and the actuator system and configured to, by a processor:
receive vehicle data, user input data, and image data from the image sensor;
initialize intrinsic and extrinsic parameters associated with the image sensor including a connected camera based on the vehicle data, the user input data, and the image data, wherein the intrinsic parameters comprise a focal length ($f_c$) and a principal point ($P_x$) of the connected camera and the extrinsic parameter comprises a placement of the image sensor relative to a vehicle cabin of the vehicle;
store in a datastore device, the intrinsic and extrinsic parameters associated with the image sensor, wherein the image sensor is coupled to the trailer and configured to capture the image data that includes the at least the portion of the vehicle;
receive the image data from the image sensor of the trailer;
identify a center high mount stop light (CHMSL) region of the vehicle in the image data with a bounding box and a center point, wherein the CHMSL is a static feature of an exterior of the vehicle;
determine a region of interest within the image data based on the CHMSL region of the vehicle in the image data with the bounding box and the center point;
compute a hitch articulation angle from the region of interest and the intrinsic and extrinsic parameters while the vehicle is operating, wherein the computing the real-time hitch articulation angle is based on:

$$\theta = \arcsin\left(\frac{bP_x f_c + \sqrt{a^2 P_x^2 f_c^2 + b^2 P_x^4 - a^2 P_x^4}}{a(f_c^2 - P_x^2)}\right),$$

where a and b represent the placement of the image sensor relative to the vehicle cabin, $P_x$ is the principal point of the connected camera, and $f_c$ is the focal length of the connected camera; and generating control signals to the actuator system to automatically control features of the vehicle and the trailer based on the hitch articulation angle, wherein the features of the vehicle comprise the propulsion system, the transmission system, the steering system, and the braking system of the vehicle.

15. The vehicle of claim 14, wherein the computer system is configured to, by the processor, store based on the user input received from a user of the vehicle.

16. The vehicle of claim 14, wherein the computer system is configured to, by the processor, store based on the intrinsic and extrinsic parameters determined from a regression model.

17. The vehicle of claim 16, wherein the computer system is further configured to, by the processor, process the region of interest with the regression model and a kinematic model of the vehicle and the trailer to determine the intrinsic and extrinsic parameters.

18. The vehicle of claim 14, wherein the features of the vehicle further comprise doors of the vehicle.

19. The vehicle of claim 14, wherein the features of the vehicle further comprise a trunk of the vehicle.

20. The vehicle of claim 14, wherein the features of the vehicle further comprise cabin features of the vehicle.

* * * * *